(12) United States Patent
Hansen et al.

(10) Patent No.: US 10,661,241 B2
(45) Date of Patent: May 26, 2020

(54) CHEMICAL REACTOR WITH CATALYST SUPPORT SYSTEM

(71) Applicant: Haldor Topsøe A/S, Kgs. Lyngby (DK)

(72) Inventors: Anders Helbo Hansen, Espergærde (DK); Thomas Sandahl Christensen, Kgs. Lyngby (DK); Magnus Møller Jørgensen, Copenhagen Ø (DK); Johannes Ruben Larsen, Fredericia (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 16/477,078

(22) PCT Filed: Feb. 22, 2018

(86) PCT No.: PCT/EP2018/054337
§ 371 (c)(1),
(2) Date: Jul. 10, 2019

(87) PCT Pub. No.: WO2018/153955
PCT Pub. Date: Aug. 30, 2018

(65) Prior Publication Data
US 2019/0329206 A1    Oct. 31, 2019

(30) Foreign Application Priority Data
Feb. 27, 2017    (DK) .................................. 2017 00131

(51) Int. Cl.
*B01J 8/02*    (2006.01)
*B01J 8/00*    (2006.01)

(52) U.S. Cl.
CPC ........... *B01J 8/0085* (2013.01); *B01J 8/0264* (2013.01); *B01J 2208/00884* (2013.01)

(58) Field of Classification Search
CPC ............ H05B 37/0227; H05B 37/0281; H05B 37/0218; A61M 21/02; A61M 2210/0612; A61M 2021/0044; B01J 8/0085; B01J 8/0264
USPC ........................................................ 422/211
See application file for complete search history.

(56) References Cited

U.S. PATENT DOCUMENTS

| | | |
|---|---|---|
| 2,899,286 A | 8/1959 | Miller |
| 3,818,667 A | 6/1974 | Wagner |
| 4,275,018 A | 6/1981 | Braun |
| 4,764,347 A | 8/1988 | Milligan |
| 4,814,117 A | 3/1989 | Leva |
| 2002/0071790 A1 | 6/2002 | Woods et al. |
| 2007/0020445 A1* | 1/2007 | Liu ....................... B81C 99/008 428/195.1 |

FOREIGN PATENT DOCUMENTS

| | | |
|---|---|---|
| CN | 202606129 U | 12/2012 |
| GB | 1 473 173 A | 5/1977 |
| GB | 2 297 923 A | 8/1996 |
| WO | WO 01/23080 A1 | 4/2001 |

* cited by examiner

*Primary Examiner* — Huy Tram Nguyen
(74) *Attorney, Agent, or Firm* — Blank Rome LLP (57) ABSTRACT

The invention relates to a chemical reactor comprising at least one catalyst support system and anti-blocking means arranged around and above a reactor opening, which prevents catalyst or other reactor parts to enter or exit a reactor opening.

21 Claims, 7 Drawing Sheets

CHEMICAL REACTOR WITH CATALYST SUPPORT SYSTEM

FIELD OF THE INVENTION

The invention relates to a chemical reactor comprising a catalyst. More specifically, the invention relates to a catalyst support system arranged in the lower part of the chemical reactor to prevent the catalyst from entering and/or exiting the reactor through one or more process fluid openings in the reactor and it relates to arranging the catalyst support system with high strength.

BACKGROUND

Syngas is a mixture of hydrogen and carbon monoxide and it is produced by conversion of methane and other hydrocarbons with steam over a steam reforming catalyst through the steam methane reforming process in one form or another. In ammonia production tubular reforming is combined with secondary reforming and air is added to the secondary reformer to combust residual methane from the primary reformer and to adjust the syngas ratio to achieve the $H_2/N_2$ ratio of approx. 3.0 for the ammonia synthesis. When $N_2$ is an undesired constituent in syngas, pure oxygen can be used as oxidant in the secondary reformer and this is the case in methanol plants. For methanol production a so-called "two-step reforming"-concept combining a tubular reformer with an oxygen-blown secondary reformer in the syngas section. The process lay-out includes adiabatic pre-reforming, tubular reforming and oxygen-blown secondary reforming. The oxygen acts as a source for internal process combustion of hydrocarbons coming from the tubular reformer. Operating conditions of the oxygen-blown secondary reformer are characterized by higher combustion temperatures than in air-fired lay-outs.

Another syngas technology is Autothermal reforming (ATR) which is a stand-alone process technology in which the tubular reformer is eliminated from the lay-out and pre-reformed natural gas is sent directly to an ATR reformer in which hydrocarbons are combusted by oxygen. By omitting the tubular reformer, the steam addition to the feedstreams can be reduced significantly.

For large-scale methanol plants, Autothermal reforming is today an alternative to two-step reforming technology for larger production capacity methanol plants of ie 5000 tpd.

ATR is a preferred technology for syngas manufacturing in GTL plants (Gas-to-Liquid) in which diesel is produced via Fischer-Tropsch (FT) synthesis. Syngas with $H_2/CO$ ratio of 2.0 can be produced directly with ATR reforming and such is especially suited for FT synthesis and production of FT liquids.

Operating conditions for the ATR reformer are even more severe than for oxygen blown secondary reformers and even more robust reactor layout are required for operation in ATR reformers. The steam-to-carbon feed ratio is lower and the combustion intensity and the flame temperature are much higher in ATR reformers.

The reactor design for ATR, oxygen-blown secondary reformers and air-blown secondary reformers comprises a burner, a combustion chamber, target tiles, a fixed catalyst bed, a catalyst bed support structure, a refractory lining, and a reactor pressure shell.

The catalyst bed support system serves both as structural support for the catalyst bed and as an outlet flow distributor guiding the syngas from the catalyst bed into the transfer line to the waste heat recovery system downstream the reformer.

Such catalyst support systems have lay-outs that can be of various geometry, i.e. cone type structures, arch-type or dome type constructions. Dome and arch shaped catalyst support systems can suffer from failure and collapse. Cone type of catalyst support system has been used with good performance as catalyst support system, and failures and collapses with this type have not been observed. However, some degree of maintenance is generally reported to individual pieces of the ceramic elements and especially thin walled structural elements in vertical and/or horizontal direction.

The catalyst support system may be in contact with inerts for instance in the shape of spheres or lumps. These deliver forces onto the catalyst support system in points where stress levels can become excessive and initiate cracks which may result in failing of the bricks which the catalyst support system is made of.

Also the inerts block or partly block the flow area in the catalyst support system in the flow channels or in the inlet section of the channels, making the pressure drop over the support rise.

Known art offers little solution to this problem, as can be seen in the following references, where:

US2002071790 describes an integrated reactor for producing fuel gas for a fuel cell, the integrated reactor comprises a waste gas oxidizer (WGO) assembly having an associated WGO chamber, an inlet, an outlet and a flow path for exothermic gases produced in the WGO chamber. The integrated reactor has an auto-thermal reactor (ATR) assembly located within the WGO chamber. The ATR assembly has an inlet means and an outlet means for process gases flowing there through and a catalyst bed which is intermediate the inlet and outlet means. At least a part of the inlet means of the ATR assembly is located in the flow path of the WGO chamber to facilitate the transfer of thermal energy.

CN202606129 describes a non-metal high-temperature catalyst supporting piece. The catalyst supporting piece is arranged in a reactor and comprises a corundum brick support and a foamed ceramic plate arranged on the corundum brick support; and mounting contact surfaces of the corundum brick support and the foamed ceramic plate are saw-toothed; the corundum brick support is formed by integrally mortising at least two kinds of specially-shaped corundum bricks; mortar is filled in gaps among the specially-shaped corundum bricks; and ceramic fibre paper is filled in an annular gap between the corundum brick support and the inner wall of the reactor. The catalyst supporting piece has the characteristics of high temperature resistance, corrosion resistance, high mechanical strength, convenience in mounting, long service life and no catalyst leakage. The foamed ceramic plates of different specifications can selected according to the granular size of catalysts, and the tops of the corundum bricks contacted with the foamed ceramic plates have tooth-shaped structures, so that the smoothness of airflow is guaranteed; mortise structures are adopted by the corundum bricks, and the mortar is filled in the gaps among the corundum bricks, so that long-period running of equipment can be guaranteed; and the catalyst supporting piece is widely applied to chemical industry, pharmaceutical industry, petrochemical industry and the like.

None of the above known art references offer a solution to the problem of protecting a catalyst support system in a chemical reactor against damage and blockage by catalyst or other reactor particles.

SUMMARY OF THE INVENTION

Embodiments of the invention generally relate to a chemical reactor comprising a catalyst and a catalyst support system arranged in the lower part of the reactor. The catalyst support system shields at least one opening in the lower part of the reactor from the catalyst, to prevent the catalyst from access to the opening which may otherwise lead to the catalyst at least partly blocking the opening or exiting the reactor through the opening. It is however important that the catalyst support system does not block the opening, since fluid must be able to flow in or out of the opening. Also the pressure loss of the fluid through the catalyst support system is critical, a high pressure loss increases the demand on blowers/pumps and in the end increases the cost of running the chemical reactor. Therefore, the catalyst support system comprises flow channels which enables the process fluid to flow to or from the reactor through the reactor opening. The cross sectional flow area as well as the length of these flow channels influences the pressure loss for the fluid passing through the catalyst support system. It is important that the flow channels are not blocked by the catalyst or other parts in the reactor, since this may lead to an increase of the pressure loss for the process fluid passing through the catalyst support system. The catalyst support system is also vulnerable to mechanical damage where the catalyst or other reactor parts are in contact with the catalyst support system, especially the edges around the flow channels. Therefore, the catalyst support system further comprises anti-blocking means, arranged to prevent blocking of the flow channels and to prevent the catalyst or other reactor particles from damaging the catalyst support system. The anti-blocking means are constructed and arranged to ensure that the catalyst or other reactor parts cannot pass through the anti-blocking means and block the flow channels. They are also constructed and arranged to ensure that the catalyst or other reactor parts which do settle upon the anti-blocking means do not entail a critical rise in pressure loss.

In an embodiment of the invention, said anti-blocking means comprise a geometrical flow labyrinth with an outer face of the catalyst support system with a larger cross sectional flow area than the cross sectional flow area of the flow channels. This outer face is the surface upon which the catalyst or other reactor parts settles upon. Each contact point between this outer face and the catalysts or other parts may indeed partly block the catalyst support system which may lead to an increased pressure loss. But by having a larger cross sectional flow area of the outer face of the catalyst support system than the cross sectional flow area of the flow channels, it is ensured that this pressure loss is minimized and not critical.

More specifically, in an embodiment of the invention, the minimizing of the pressure loss is enabled by a cross sectional flow area of the outer face of the catalyst support system which is between 1.1 and 4.0 times larger than the total cross sectional flow area of the flow channels. Even more specifically, the cross sectional flow area of the outer face of the catalyst support system may be between 1.1 and 2.0 or even between 1.2 and 1.7 times larger than the total cross sectional flow area of the flow channels.

In an embodiment of the invention, the anti-blocking means comprises ramparts. The outer face of the catalyst support system is thus constructed with protruding members which are spaced apart, the space between the protruding members, the ramparts ensures sufficient cross sectional flow area of the anti-blocking means, while having a dimension which does not allow the catalyst or other reactor parts to pass through it. The ramparts have a construction and strength which protects against mechanical damage, which may otherwise occur in the contact with the catalyst or other reactor parts.

In a further embodiment of the invention, the catalyst support system may comprise a plurality of bricks, which when put together forms the catalyst support system. The flow channels are comprised in the catalyst support system and may either be internal flow channels in each or some of the bricks which then are hollow, flow channels formed by the outer geometry of the bricks when these are put together to form the catalyst support system, or both internal and external (relative to the bricks) formed flow channels. In an embodiment, the bricks comprise protrusions of any shape, in one embodiment more specifically brick legs and bricks shoulders, i.e. downwards or upwards and outwards protruding parts of the bricks and when put together side by side and on top of each other, the protruding parts of the bricks ensure the formation of flow channels between the bricks. Each brick may comprise a single leg or a plurality of brick legs and likewise, each brick may comprise one or a plurality of brick shoulders.

In an embodiment, said bricks are constructed to be arranged together to form an assembled catalyst support system in the form of a cone, dome, an arch, a cylinder, pyramid an inverted cone, a half doughnut or in a flat form, any shape which is constructional stable and serves the purpose best of protecting the catalyst or any other reactor parts from entering or exiting the reactor opening which the catalyst support system is arranged around and above, while keeping the pressure drop at an acceptable minimum and also preventing blocking of the catalyst support system flow channels. In an embodiment this is obtained by arranging the bricks in layers on top of each other.

Said anti-blocking means of the catalyst support system may in one embodiment be an integral part of the bricks, or they may in another embodiment be an extra independent part or layer which is arranged in connection to the outwards facing part of the bricks, i.e. the part of the bricks which are facing out towards the catalyst or other reactor parts, away from the reactor opening which the bricks are arranged above and around. Also an embodiment may combine anti-blocking means which are integrated with the bricks, with anti-blocking means which are independent parts arranged on the outside of said catalyst support system. In any case, the anti-blocking means may in an embodiment comprise oblong elements arranged perpendicular to the flow channels of the catalyst support system. These oblong elements may form continuous oblong anti-blocking means, such as for instance anti blocking rings or lines formed on the outside of the catalyst support system, with a distance between each continuous oblong element which allows for process fluid flow to the flow channels. The distance may be large enough to provide a cross sectional flow area which is larger than the cross sectional flow area of the flow channels, even when catalyst or other reactor elements are contacting and resting upon the anti-blocking means (and a partly blockage of the anti-blocking means cross sectional flow area is anticipated), but small enough to prevent said catalyst or other reactor parts to pass through the distance between the anti-blocking means. The specific distance between the anti-blocking means is adapted to the specific case, the larger the catalyst particles or other reactor parts are, the larger the distance may be. In a specific embodiment, the inert particle shape is the same size or larger than said distance between the anti-blocking means, the slot width, more specifically the inert particle size is 1.05-4.0, more specifically 1.8-3.5 times larger than the slot width.

In an alternative specific embodiment, the catalyst particle shape is the same size or larger than said distance between the anti-blocking means, the slot width, more specifically the catalyst particle size is 1.05-4.0, more specifically 1.1-1.7 times larger than the slot width.

In a specific embodiment, the anti-blocking means have a triangular cross-sectional shape with rounded corners of the triangle. While simple to produce, the triangular cross-sectional shape ensures constructional strength and the rounded corners minimizes the risk of fragmenting and cracking of the anti-blocking means as well as the risk of damage to the catalyst or other reactor parts which contact the anti-blocking means.

The mentioned other reactor parts may in an embodiment comprise inert elements or shaped catalyst particles arranged around and possibly also on top of the catalyst support system as a layer between the other catalyst particles and the catalyst support system, which are specially geometrically shaped to contact and support on the anti-blocking means while allowing process fluid flow through the gaps between the anti-blocking means and through the flow channels of the catalyst support system. An advantageous shape of these inert elements or shaped catalyst particles is in one embodiment a sphere, which is constructional stable and strong and which allows for sufficient process fluid flow, as the contact (and partly blocking) points between these spheres and the anti-blocking means are relative small compared to the free flow area between the spheres and between the spheres and the anti-blocking means. In a further embodiment, the geometrical shape may be a ring shape, which also ensures process fluid flow through the flow channels of the catalyst support system and in yet another embodiment, the inerts may be random shaped lumps.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and they are therefore not to be considered limiting of its scope, for the invention may admit to other equally effective embodiments.

POSITION NUMBERS

01. Catalyst support system
02. Brick
03. Brick leg
04. Brick shoulder
05. Flow channel
06. Anti-blocking means
07. Mono block
08. Brick layer
09. Sphere

DETAILED DESCRIPTION

Figure 1:
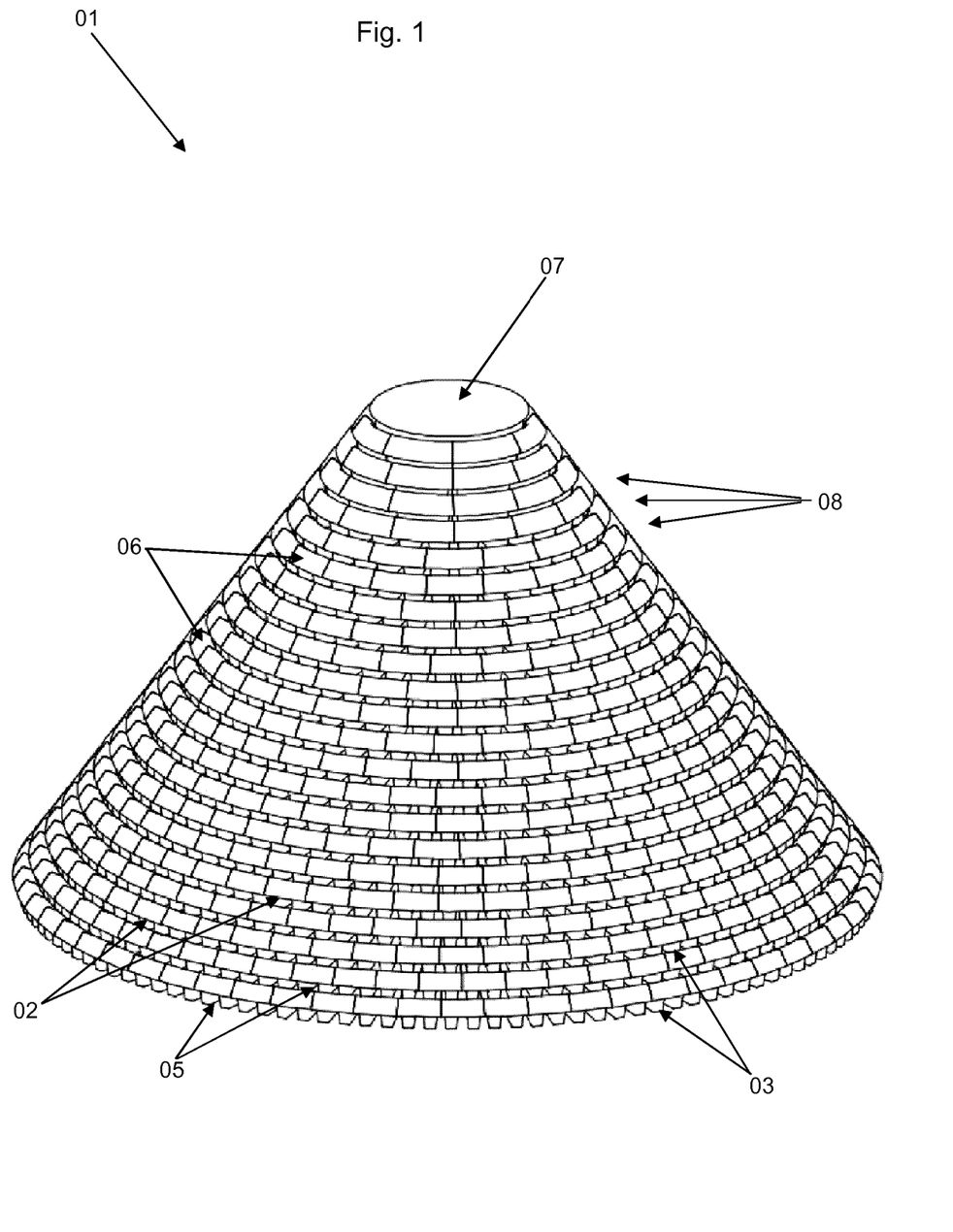
FIG. 1 shows a top/side view of a catalyst support system comprising anti-blocking means, ramparts.

FIG. 1 shows a catalyst support system 01 to be arranged in the lower part of a chemical reactor (not shown) above and around an opening (not shown) of the reactor. The reactor is partly filled with catalyst (not shown), which is arranged above and possibly also around the catalyst support system. The catalyst support system guards the reactor opening from catalyst entering or exiting the reactor opening. In the embodiment shown, the catalyst support system comprises a plurality of bricks 02 arranged in layers with circular shape. The layers are arranged on top of each other, each circular layer has a smaller diameter than the layer it is arranged on top of, whereby the total catalyst support system obtains a cone-like shape. As shown, the top of the catalyst support system may comprise a flat mono block 07, to close the top of the cone, so no catalyst may enter. Depending on the design demands for the catalyst support system, the cone height may be varied by varying the diameter of the flat mono block. The bricks each comprise brick legs 03 and brick shoulders 04 which form process fluid flow channels 05 between them, and anti-blocking means 06 in the form of ramparts, which can be seen and will be explained in more detail in the following. As best shown on this figure however, is that the flow channels in this embodiment runs radially in the circular brick layers, whereas the distance between each layer of ramparts forms circular gaps for the process flow to flow through, outside the flow channels. In some of the top layers of the catalyst support system, the bricks may not have flow channels, which only slightly affects the total cross sectional flow area of the catalyst support system, since the top layers have relative small diameters compared to the lower layers.

Figure 2:
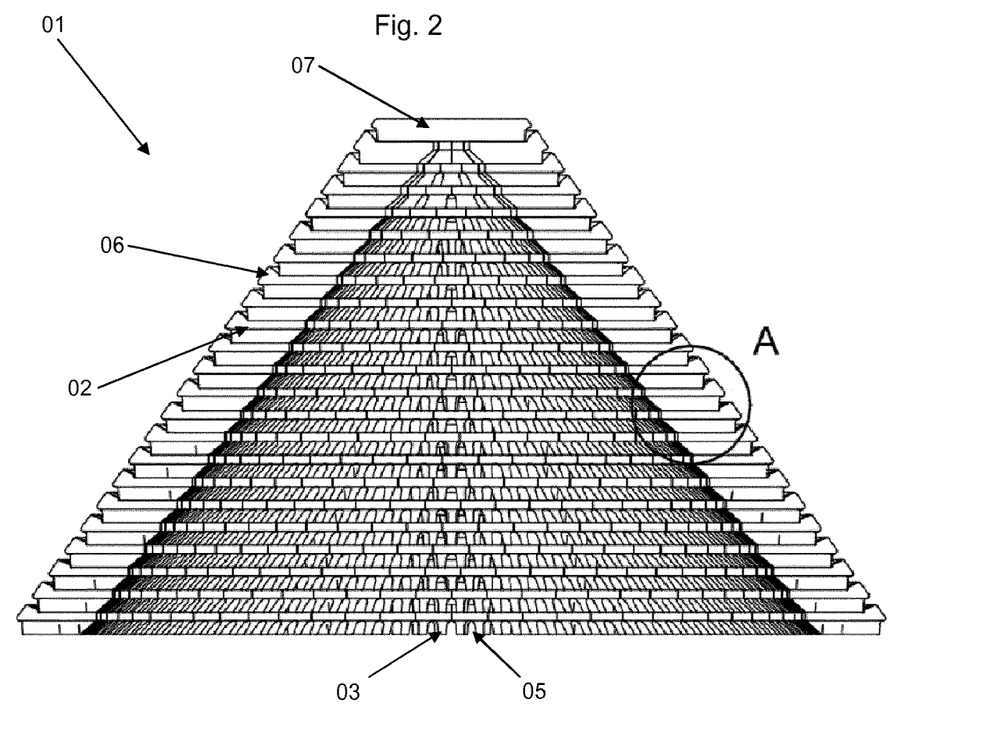
FIG. 2 shows a cross sectional view of a catalyst support system comprising anti-blocking means, ramparts.

A cross sectional view of the catalyst support system of FIG. 1 is shown on FIG. 2. Here it is shown how the inner part of the cone shaped catalyst support system is hollow, which allows for the reactor opening to be positioned beneath the cone. As the layers of bricks are circular and the rampart partly interlocks them to prevent an upper layer to slide outwards relative to the layer beneath it, the cone can be assembled layer by layer without the risk of collapsing inwards.

Figure 3:
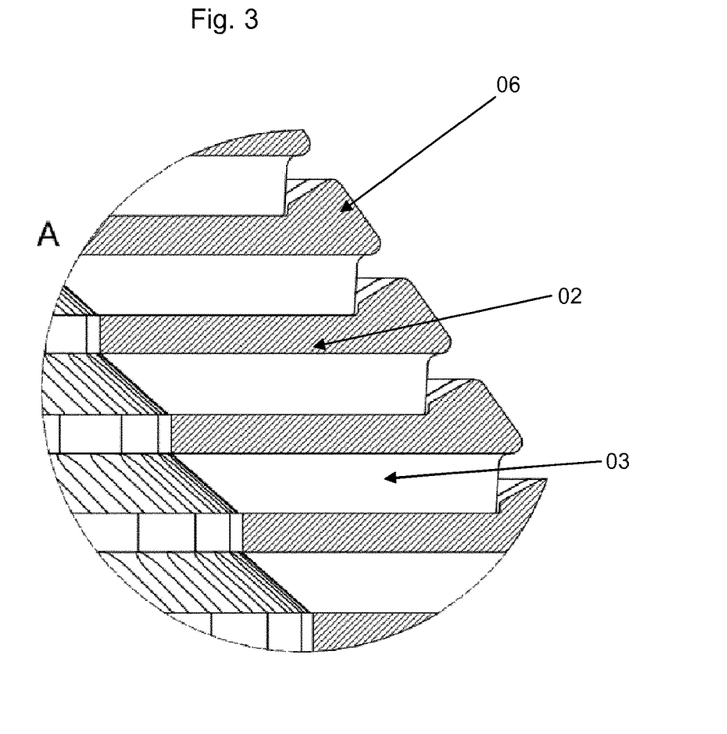
FIGS. 3 and 4 show a cross sectional detail side view of a bricks comprising anti-blocking means.
Figure 4:
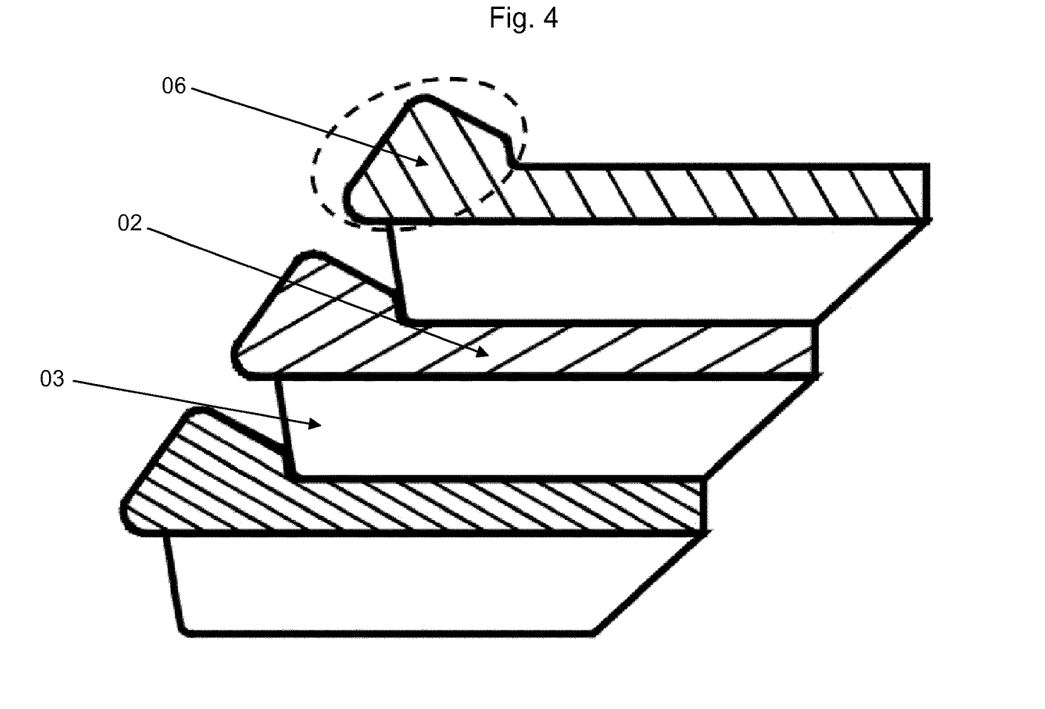

A cut sectional view (A) of the catalyst support system shown in FIG. 2 (and 1) is seen in more detail in FIG. 3. The anti-blocking means 06 is in cross sectional shape of a triangle with rounded corners. A strong and crack resistant shape, protecting the brick legs 03 and flow channels against process fluid flow blocking and against mechanical damage from contact with catalyst or other reactor parts (not shown). Also seen is the slight "step", the 90° corner between the top of the brick and the rampart. The next brick layered on top of a brick will rest against this step, which prevents it from sliding outwards relative to the brick(s) in the layer below, which is also seen in the detail cross sectional view of FIG. 4.

Figure 5:
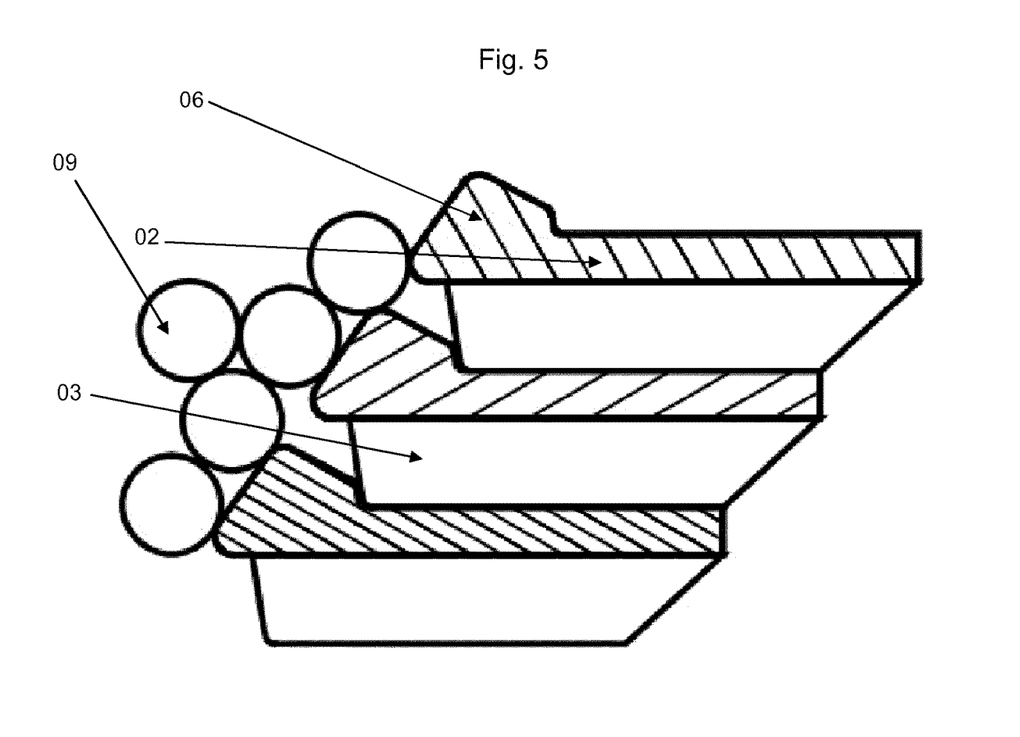
FIG. 5 shows a cross sectional detail side view of a bricks comprising anti-blocking means and spheres.
Figure 6:
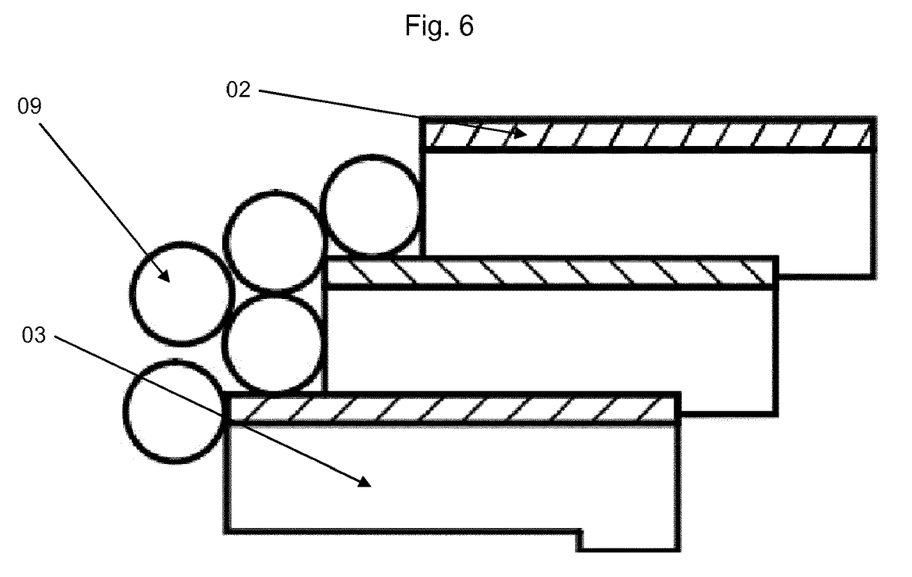
FIG. 6 shows a cross sectional detail side view of a bricks without anti-blocking means, and spheres.

In FIG. 5 an embodiment is shown, where the construction of the bricks and ramparts in the catalyst support system is similar to the foregoing figures, but it is shown how catalyst or inert particles in the reactor, in this case in the form of spheres 09 rests upon the outer surface of the catalyst support system. As can be seen, the distance between the ramparts is smaller than the diameter of the spheres, which therefore rest upon the rampart which hence protects the more fragile brick legs from contact with the spheres, contrary to known art as shown in FIG. 6, where the spheres have direct contact with the brick legs. Because of the sturdy construction and geometry of the rampart, there is less risk of breakage and damage by contact with the spheres with the load of the whole catalyst bed above. The reactor may comprise a bed of catalyst as well as inert particles of different shape. For instance, the bed may comprise inert spheres in contact with the catalyst support system in the bottom of the bed and catalyst particles which may have a different geometrical shape and size than the spheres in the upper part of the bed, on top of the spheres. The spheres may also comprise catalytic active material.

Figure 7:
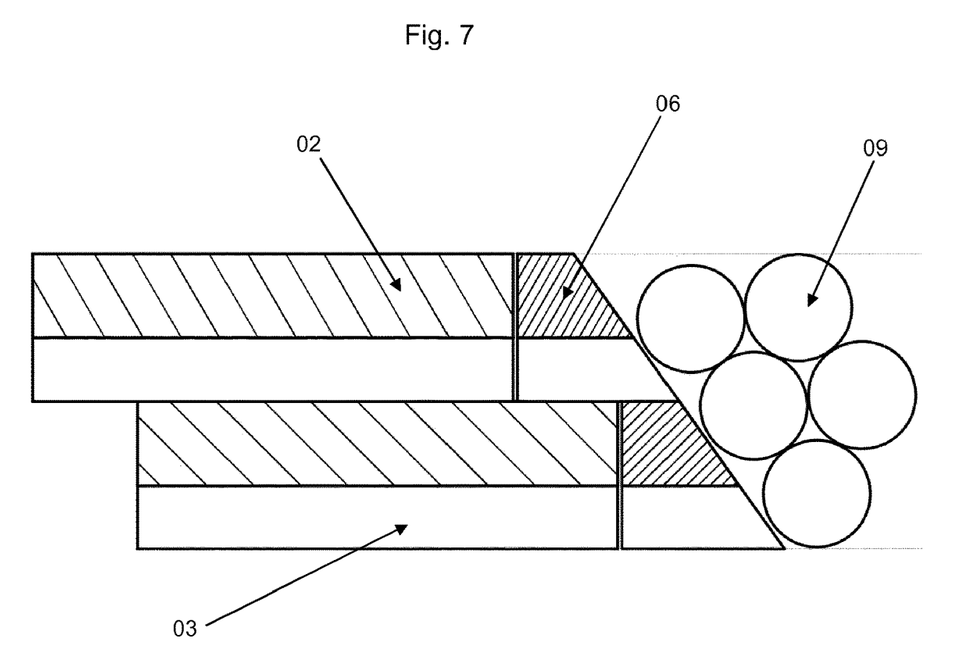
FIG. 7 shows a cross sectional detail side view of a bricks comprising protection means, and spheres.

In the embodiments discussed above, the anti-blocking members are integrated with the bricks. A further embodiment as shown in FIG. 7 has anti-blocking means which are not integrated with the bricks, but arranged on the outside of the bricks. This enables the anti-blocking means to be replaced without replacing the inner bricks.

Figure 8:
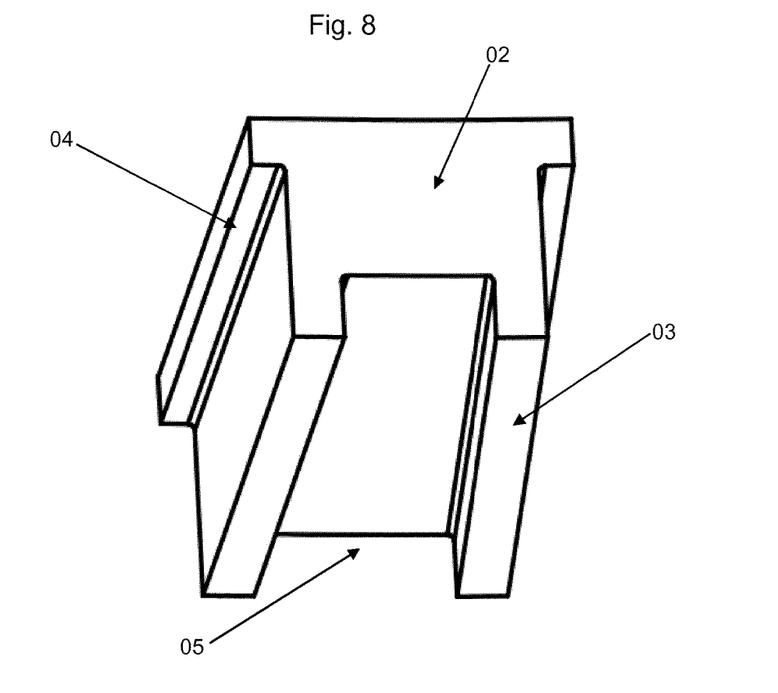
FIG. 8 shows a detail isometric view of a brick without anti-blocking means.
Figure 9:
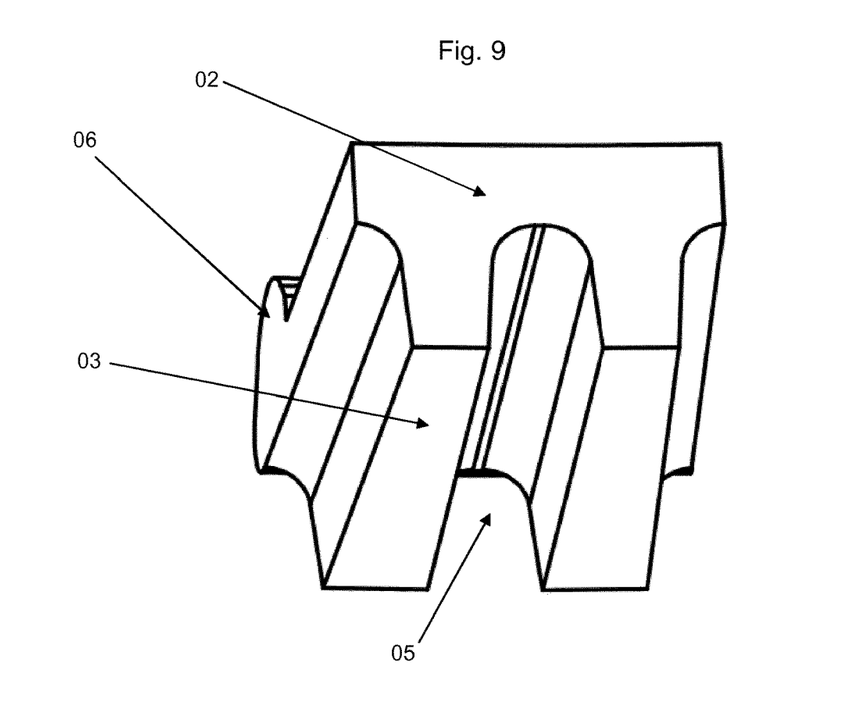
FIG. 9 shows a detail isometric view of a brick comprising a rampart.
Figure 10:
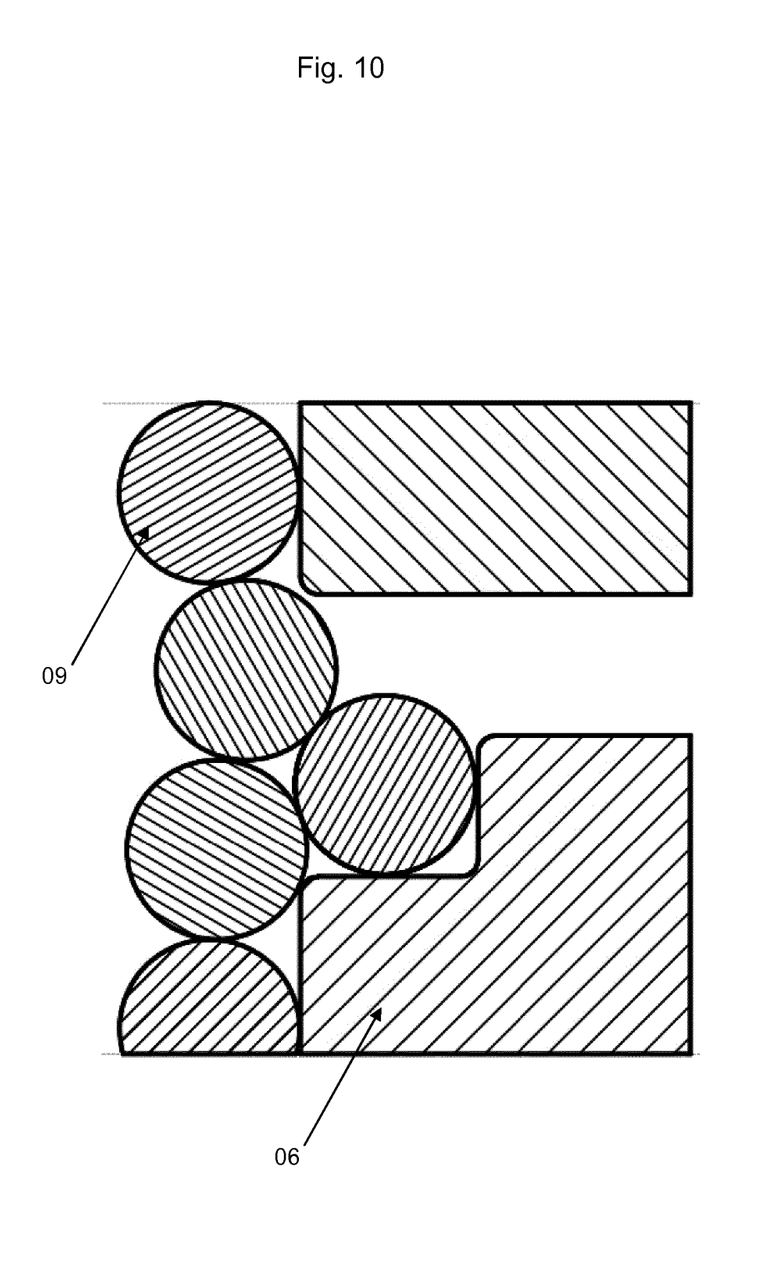
FIGS. 10-16 show detail views of spheres in combination with geometrical shapes.
Figure 11:
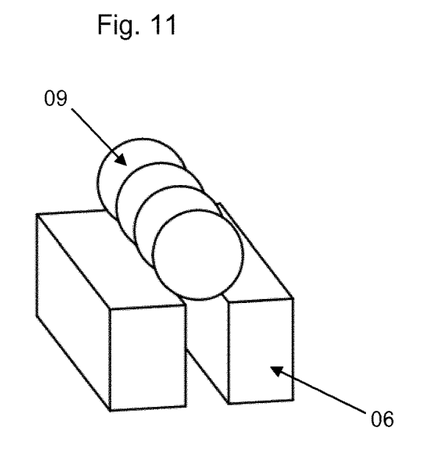

In the embodiment where the catalyst support system is cone shaped, the bricks may be slightly wedge-shaped as seen in FIG. 8, whereby the shoulders of the bricks are able to contact adjacent brick shoulders on the entire shoulder side area when the circle shaped brick layer is formed. As the layer diameter decreases upwards in the cone shaped catalyst support system, the wedge-angle of each brick will be increased to maintain this tight geometrical fit of the brick shoulders. The brick legs shown in FIG. 8 refers to known art catalyst support system, where it was necessary to have a larger cross sectional area of the flow channels in the bricks outwards facing side, to compensate for the partly blocking of the flow channel by reactor particles such as catalyst or inert particles. But according to this invention, as shown in FIG. 9, it is possible to maintain an even cross sectional area of the flow channels in the bricks, since the outer located ramparts protects the flow channels against damage as well as process fluid flow blockage. This in turn leaves the outer part of the brick legs more sturdy as the dimensions are larger, and thus again minimizes the risk of damage to the bricks.

Figure 12:
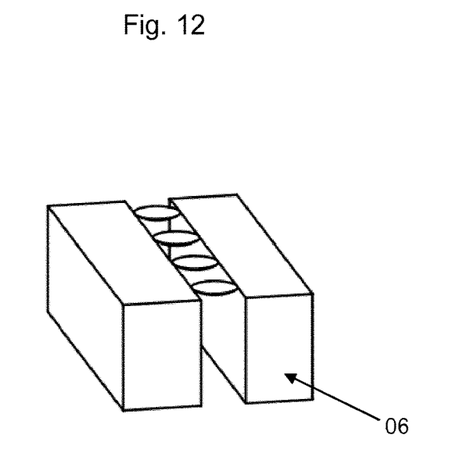
Figure 13:
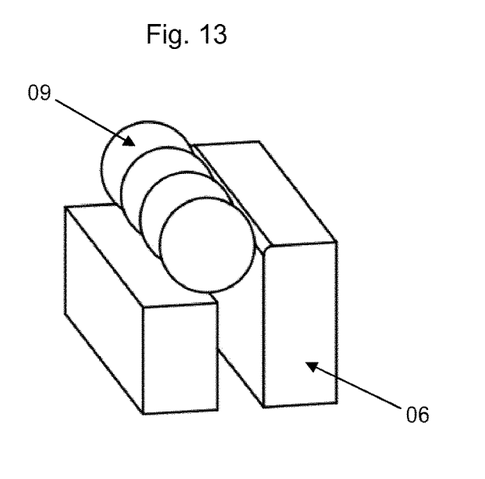
Figure 14:
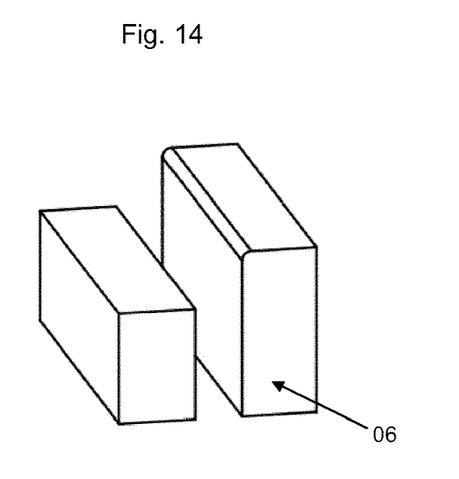
Figure 15:
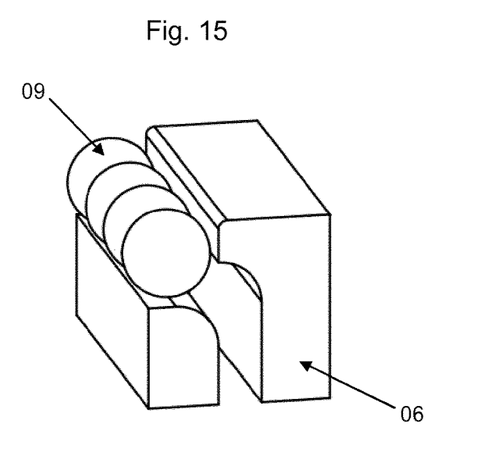
Figure 16:
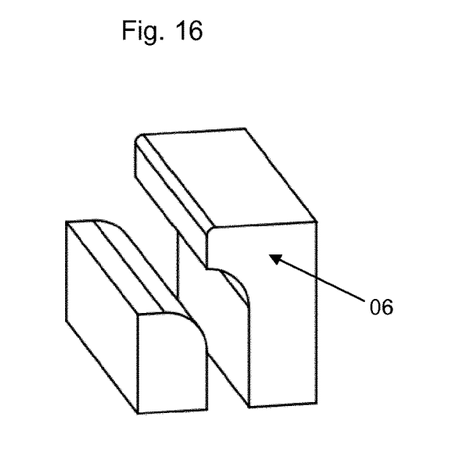

The above Figures are only some possible embodiments of the invention. Several other geometrical constructions of anti-blocking means are possible according to the invention, whereas some are shown in FIGS. 10-16. The overall principle is to protect the catalyst support system against both damage and flow blockage, which is possible with anti-blocking means arranged on the outside of the catalyst support system with a sturdy construction and in some embodiments a larger process flow cross sectional area than the cross sectional flow area than the flow channels. In some embodiments, where spheres are chosen to be in contact with the anti-blocking means, the blocked area can be calculated as shown in FIG. 12. As mentioned before bricks and anti-blocking means of several designs can be chosen as best suited for the given task, including but not limited to bricks with one or several flow channels and with internal (bore) or external flow channels, as well as catalyst support systems of different shapes as described.

The invention claimed is:

1. A chemical reactor holding a fixed bed catalyst, comprising a catalyst support system arranged in the lower part of the reactor for shielding at least one lower part reactor opening from said catalyst, the catalyst support system comprises flow channels to enable process fluid to flow to or from the reactor through said reactor opening, wherein the catalyst support system further comprises anti-blocking means to prevent blocking of said flow channels, wherein said anti-blocking means comprises a geometrical flow labyrinth comprising an outer face of the catalyst support system with a larger total cross sectional flow area than the total cross sectional flow area of the flow channels.

2. A chemical reactor according to claim 1, wherein the cross sectional flow area of the outer face of the catalyst support system is between 1.1 and 4.0 or 1.1 and 2.0 or 1.2 and 1.7 times larger than the total cross sectional flow area of the flow channels.

3. A chemical reactor according to claim 1, wherein the anti-blocking means comprise ramparts.

4. A chemical reactor according to claim 1, wherein the catalyst support system comprises a plurality of bricks comprising said flow channels.

5. A chemical reactor according to claim 4, wherein said bricks are adapted to form a catalyst support system which is in the form of a cone, a dome, an arch, a cylinder, a pyramid, an inverted cone, a half doughnut or has a flat form.

6. A chemical reactor according to claim 5, wherein said bricks are adapted to be arranged in layers to form the catalyst support system.

7. A chemical reactor according to claim 5, wherein said bricks comprise one or more brick legs and brick shoulders, and said flow channels are formed between said brick legs.

8. A chemical reactor according to claim 5, wherein said bricks comprise protruding spacers, and said flow channels are formed between said protruding spacers.

9. A chemical reactor according to claim 5, wherein said bricks are hollow, and said flow channels are formed in the hollow space within the bricks.

10. A chemical reactor according to claim 1, wherein said flow channels have an even cross sectional flow area through the catalyst support system.

11. A chemical reactor according to claim 5, wherein the anti-blocking means are an integrated part of said bricks.

12. A chemical reactor according to claim 1, wherein the anti-blocking means are oblong elements arranged perpendicular to the flow channels.

13. A chemical reactor according to claim 1, wherein the anti-blocking means have a triangular cross-sectional shape and rounded corners.

14. A chemical reactor according to claim 1, wherein the anti-blocking means are independent elements arranged on the outside of said catalyst support system.

15. A chemical reactor according to claim 1, further comprising inert elements or catalyst arranged around said catalyst support system and geometrically shaped to support on said anti-blocking means, while allowing process fluid flow through said flow channels.

16. A chemical reactor according to claim 15, wherein said inert elements are spheres.

17. A chemical reactor according to claim 15, wherein said inert elements are ring shaped.

18. A chemical reactor according to claim 15, wherein said inert elements are random shaped lumps.

19. A chemical reactor according to claim 15, wherein the particles with catalytic activity are arranged around said catalyst support system.

20. A chemical reactor according to claim 16, wherein the inert particle shape is of the same size or larger than the slot width of the anti-blocking means.

21. A chemical reactor according to claim 19, wherein the catalyst particle shape is of the same size or larger than the slot width of the anti-blocking means.

* * * * *